Jan. 29, 1952 — R. E. WILSON — 2,584,075
PROJECTION APPARATUS WITH OPTICAL COMPENSATOR FOR MULTIPLE OBJECTS
Filed April 6, 1949 — 2 SHEETS—SHEET 2
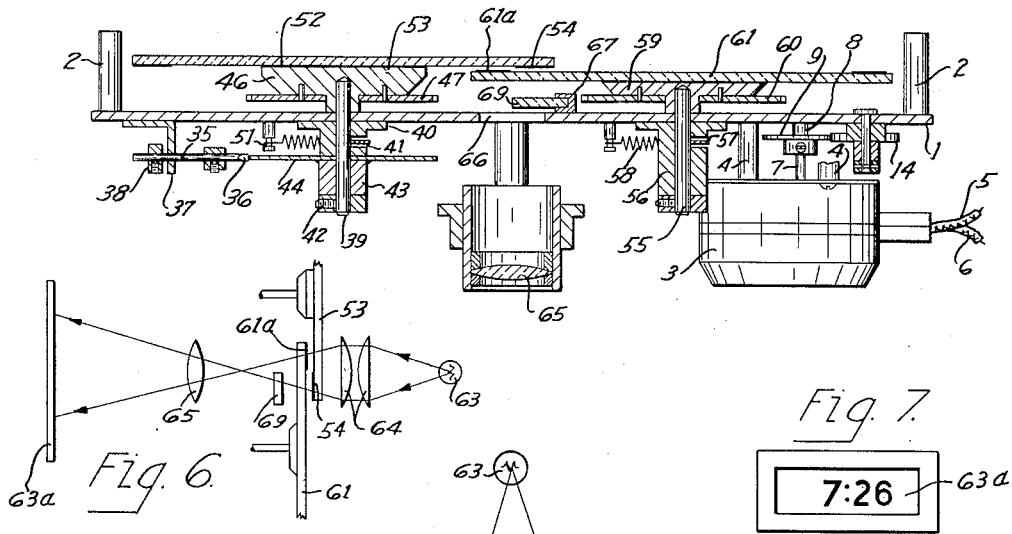
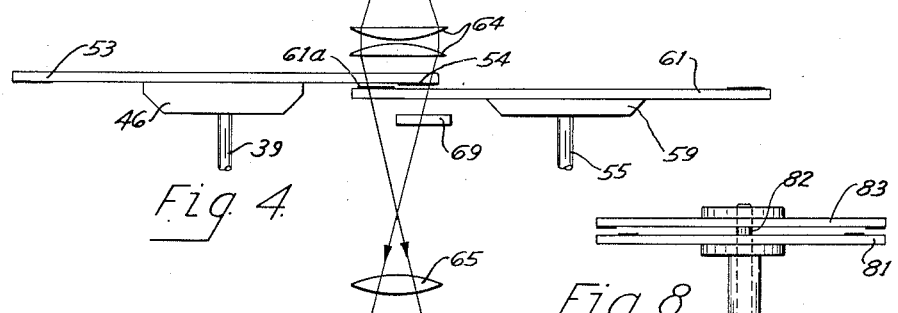
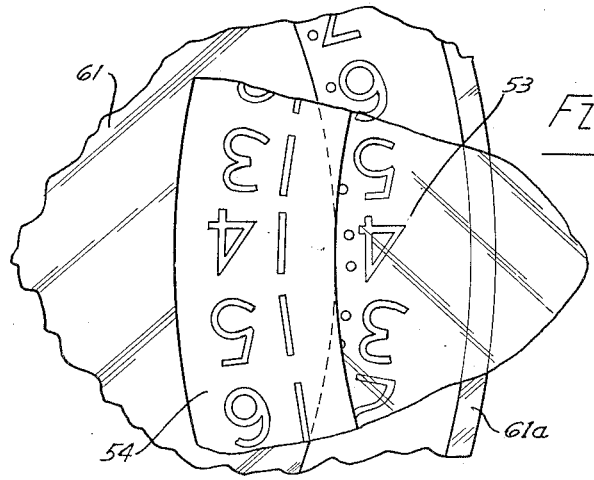
INVENTOR.
RUSSELL E. WILSON
BY
ATTORNEY.

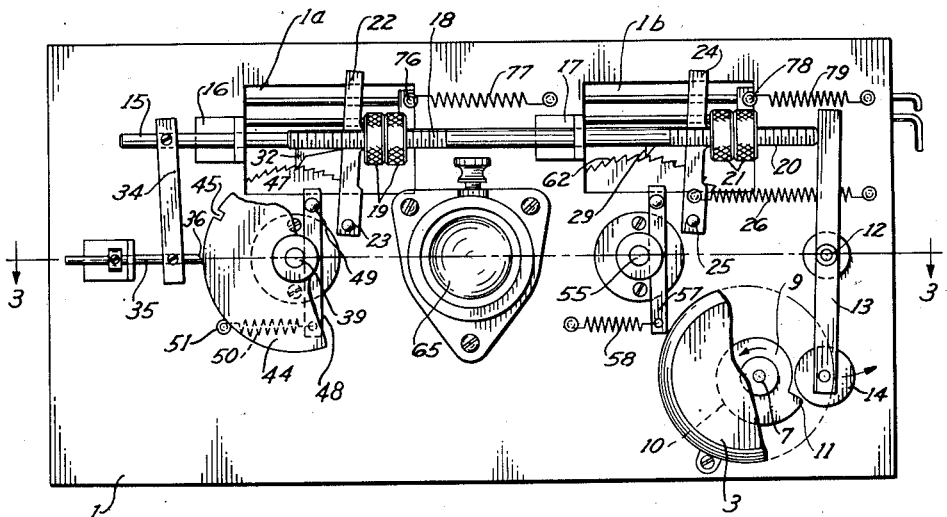

Patented Jan. 29, 1952

2,584,075

UNITED STATES PATENT OFFICE 2,584,075

PROJECTION APPARATUS WITH OPTICAL COMPENSATOR FOR MULTIPLE OBJECTS

Russell E. Wilson, Cleveland, Ohio

Application April 6, 1949, Serial No. 85,774

16 Claims. (Cl. 88—24)

My invention pertains to an optical apparatus. More specifically, the origination involves the successful enlarging projection as images of small objects symbols, designs or the like which are closely adjacent to each other not only crosswise of the penciled rays from a source of light, but which indicia are furthermore spaced apart in a direction along the optical axis consequent to the intention to have relative movement become imparted to transparent carriers thereof.

The drawings merely exemplify the principles by projecting numerals on a screen from clock mechanism, for instance, as "7:26," or "23:08" if military time is to be told. It is to become preceived that an advantageous application may be had wherever a correlated plurality of indicia, scale, pointer-dial, recording chart or changing score tabulation may be feasibly placed in a condensed arrangement even though a manual change of one of the indicia is periodically effected. If, as now preferred, the sequential rows or rings of images to be projected bear a predetermined spatial relationship, each to one transparency while the two or more transparencies (glass discs as illustrated) overlap so that the objects on one extend beyond the objects on another when in position for projection, a minimization of compactness may be achieved and a correspondingly greater screen-enlargement may be acceptably effected. The simultaneous readings of a thermometer and barometer might be flashed, or dynamometer readings be visibly associated with other concurrent intelligence. The discs do have their margins in overlapping relationship and do not progress (turn) in the same plane, consequently neither their thickness, nor area nor marginal shape is prescribed except by the commercial desideratum against an over-all compass in any respect excessive, and provided that there be an empirical determination preparatory to accomplishing a final adjustment for correct cooperative exercise of the function of essential features.

However, when the two or more closely adjacent, indicia-bearing transparencies are thus advantageously spaced apart in the direction of the optical axis, one or the other would be "out of focus" unless a compensating correction were provided. That I have incorporated as one of the primary features of my invention. As exemplified, because of its simplicity and economy, it consists of an optical, focus-equalizing element which is not necessarily a lens structure, though its index of refraction should, of course, be known and suitable adjustments to suit become effected.

Moreover, the image-defining light rays which were modified by any one object, of only the row which is in a plane nearer to the source of light, thereafter become intercepted by the focus-equalizing unit. The character of the focus-equalizer (its determined index of refraction) will rightly determine the axial spacing between the indicia-bearing transparencies or the axial spacing should determine the index of refraction. In effect, the planes, in which the rows of indicia lie respectively, will be brought to substantial, functional coincidence by the interpositioning of the equalizing unit.

Accordingly, some of the objects of my invention may be listed as follows:

Compactness, sturdiness and adequate economy of manufacture of the apparatus in its entirety.

Automatic operation to produce progressive movements intermittently.

Optical establishment of sharp focus as between two simultaneously projected objects which are in relatively spaced relationship along the optical axis.

Overlapping, relative travel of object carriers, preferably, relative turning movements whereby to minimize over-all compass of the mechanism.

Interpositioning in the optical trail of only one of the sets of traveling indicia—of an optical element functionating to cause establishment of equally sharp focus for simultaneously projected objects of indicia which are in axially separated planes.

Provision of rotatably mounted disc-transparencies on which images appear, together with means for effecting the periodic, step-by-step actuation of said discs.

Use of actuating mechanism comprising ratchets and differentially operated pawls adapted to engage said ratchets, respectively.

Employment of friction restraint upon the shafts carrying the actuated ratchets, to prevent either "over-run" or back-drag.

Provision of an automatically operating device for controlling the bodily shift of one pawl whereby to determine whether its intermittent stroke is inutile or effective.

The performance of a method of operation involving one or more unique steps.

Incorporation of manual, initial adjustment means which is independent of the power operation.

I would have myself credited with the realization that the scope of my origination, as defined by the granted claims, comprehends equivalent constructions and methods and that the showing of the drawings and the specific descriptions are merely to exemplify variable mechanical embodiments, arrangements and applications of distinguishing principles of function which are incorporated.

Adverting to the drawings:

Figure 1 is a front elevation of plate-carried, power-actuating mechanism for effecting intermittent, dual "pawl to ratchet to disc" actuations in predetermined timed relation.

Figure 2 is a forward elevation of photographic transparencies behind the supporting plate shown in Fig. 1 and bearing overlapping rings of "hour" and "minute" numbers respectively and with upper portions broken away to reveal manual pawl-actuating adjustment mechanisms.

Figure 3 is a horizontal section on line 3—3 of Fig. 1, looking downwardly.

Figure 4 is a schematic view outlining unique features of the optical assembly.

Figure 5 is an enlarged, fragmentary view of the middle numeral arrangement of Fig. 2.

Figure 6 is a diagrammatic outline of the optical trail, from a source of light, through a condensing lens, a pair of turnable glass discs bearing rings of photographic images, an equalizing optical unit behind one numeral of the ring of numerals on only one of the discs and a projecting lens and thence to a screen.

Figure 7 is an elevation, on a reduced scale, of a pair of projected, time-telling images on a suitably located screen.

Figure 8 is a simplified modification, on a smaller scale, of the transparencies having a positioned pair of images thereon offset in two relatively transverse directions but here on coaxial shafts.

It should be understood that a suitable box will be provided for enclosing all parts; whether, as in my satisfactorily demonstrated model in which projection is to an inclined rear mirror and thence by reflection forwardly to a screen which forms a part of the front wall, or whether directly forwardly from a rear filament through a front aperture or a projecting lens mounted in the front wall and thence to a remote wall screen.

The parts next to be described and which are shown in Fig. 1, are either wholly or partly supported on an interior partition plate 1 carrying spacer studs 2. A small 1 R. P. M. synchronous electric clock motor 3 has its case carried on three or more stud brackets 4, two of which appear to view in Fig. 3. Terminals 5 and 6 lead to a source of current when the apparatus is in use. The motor drives a shaft 7 which is end-bearing steadied at 8 and rotating counter-clockwise with the shaft is a "quick rise" cam 9 formed mostly as a "gradual return" spiral 10, but with a single, abruptly-shouldered lobe 11 of which the outer edge may be slightly filleted. Fig. 1 illustrates the position of the cam 9 just before the commencement of its maximum outward thrust. Because successive indexing of the ring of numerals should be as quickly as possible, a quick-rise cam was adopted, the time interval during indexing being about four seconds. The remainder of the cam cycle is such as to accomplish a comparatively slow return and so as to make feasible a greater spring-pressure without imposing an undue strain upon the motor. In other words, too sudden a falling-off of the cam might cause the motor shaft to jump ahead of its driving force just after release by passage of the lobe 11 and tend to injure its gearing.

Rockably mounted on the plate 1 intermediately of its ends at 12, is a double lever 13, the lower end of which has turnably mounted thereon a roller 14 which is adapted reactingly to ride only against the lobe 11 and thereafter against a predetermined arcuate fraction of the spiral portion of the cam's cycle. The diameter of the roller is so chosen that after the lobe 11 has passed out of contact with it (observe the unusual direction of cam rotation, as indicated by the arrow in Fig. 1) the roller gradually approaches the motor axis, being so urged by springs to be later specified, yet maintaining a small clearance just prior to reengagement therewith of the lobe 11. The purpose of such temporary clearance will be later explained. For projecting clock time according to the illustrated application, the cam lobe will make one revolution each minute.

As the roller 14 becomes swung away from the axis of the shaft 7 by the lobe 11, the upper end of the lever 13 is rocked in the opposite direction and thrusts against the juxtaposed end of a rod 15 which is reciprocable in two guides 16 and 17. A section 18 of the rod between its guides is threaded for the interfitting of two adjusting nuts 19 and likewise a section 20 between its guide 17 and that one of its ends which is contacted by the lever 13, where two similar, thrust-initiatory and adjustable nuts 21 are provided. The plate 1 is fashioned with cut-out areas 1a and 1b between the guide 16 and nuts 19 and also between the guide 17 and nuts 21 to permit observation therethrough of certain parts as well as connection with such parts which are disposed on the other side of the plate 1. When the lever repeatedly shoves the rod 15 to the left, as viewed in Fig. 1, upon each contact of the lobe 11 with the roller 14, the nuts 19 push the upper part of an arm 22 having its lower end pivoted at 23 on the plate and the nuts 21 simultaneously push the upper part of an arm 24 having its lower end pivoted at 25—both actions being against the force exerted by a tension spring 26 which connects the lower part of the arm 24 with the plate 1. Pivoted intermediately of its ends at 27 to an upper part of the arm 24, through the opening 1b in the plate and as clearly appears in Fig. 2, is a pawl 28 having its free end formed as a prong 29 and its other end depending at 30 where a tension spring 31 connects it to the rear of the plate 1, thereby tending to depress the prong 29 against the teeth of a ratchet while also resisting the bodily travel of the pawl, all in the usual manner and as is in due time to be amplified. Likewise and in precisely the same manner, a pawl 32 is reactingly pivoted to the arm 22, another connected spring 33 exercising the same function. Manifestly, both pawls are moved bodily in unison and are also retracted (at fifty-nine minute-intervals) equal distances as determined by the thrust of the lobe 11 and in part by the effective pull of the spring 26 respectively.

Fixed to and depending from the rod 15 beyond its guide 16 (see Fig. 1) is a connector 34 the lower end of which is fixed to a stop finger 35 adapted cooperatively to govern the distance of return movement of the pawl 28—fifty-nine times uniformly. The upper side of the extremity of the finger 35 is bevelled at 36 and its middle section is guided in a plate-attached bracket 37 and beyond carries a longitudinally adjustable, shift-delimiting stop 38. The purpose of a periodic, here hourly, reciprocation of the finger 35, along with an extra retraction of the arm 24 by pull of the spring 26, is hereinafter to appear.

In substantially the same horizontal plane as the pivot 12 and finger 36 and extending from front to rear, are a pair of shafts each of which carries a plurality of members to be given indexing or intermittent partial-turning movements. One minute-hand shaft 39 (see Figs. 1 and 3) is mounted in a bearing 40 secured to the front of the plate 1 and the shaft extends through the plate and projects a certain distance beyond the bearing in front and the plate at the rear. A segmental slot 41 is formed in the bearing and its purpose is presently to be mentioned. The forwardly projecting end of the shaft fixedly carries, through the agency of a set-screw, a unitary collar 43 and circular plate 44 which latter is fashioned with a single peripheral notch 45 to be seen in Fig. 1 and into which the end 36 of the finger will become urged after each fifty-nine minutes of every hour or just prior to the reverse actuation of the rod 15 when the roller 14 is thrust away by the lobe 11. That is the slight, extra, once per hour retraction of the rod 15, arm 24 and pawl 28 which is communicated by the connector 34 between the finger 35 and the rod 15 and it is just enough of a shift to withdraw the prong 29 additionally so that it "picks up" the next ratchet tooth corresponding to some particular "hour" image, as will next be described. Obviously, more than one peripheral notch might be provided should it be desired more often to impart effective indexing movement to the hour-shift controlling pawl 28.

Likewise fixed on the rear end of the shaft 39 is a circular plate 46 to the front side of which is firmly attached, in any manner, a "minute" ratchet 47 having sixty equispaced teeth. To prevent undesirable because inaccuracy-producing either back-drag upon or over-running of the ratchet 47 when properly to be advanced only one tooth precisely by the pawl 32, a bar 48 depends from a pivot 49, intersects the segmental bearing-slot 41 and rubs against the shaft 39 in response to the pull on its lower end of a spring 50 anchored at 51. Cemented at 52 to the rear face of the plate 46 is a photographic transparency, exemplified as a glass disc 53 and provided around its forwardly-facing margin with a ring of "minute" numerals 54 which progress from "00" to "59," as partially illustrated in Figs. 2 and 5. The disc 53 is indexed or advanced one number and precisely positioned by each single-tooth actuation of the ratchet 47.

In a nearly duplicated, laterally spaced structural assembly, another shaft 55 turns in a bearing 56 against the frictional restraint of a similar bar 57 and spring 58. Rearwardly of the partition 1, the shaft 55 has turnable in unison therewith, a plate 59 having on its forward side a ratchet 60 and on its rear side a glass disc 61 which latter may be observed, in Figs. 2, 3 and 4, to be in overlapping relationship with respect to the disc 53 and with its ring of "hour" numerals 61a laterally beyond the "minute" ring of numerals 54. Observe upon inspection of Fig. 3 that the photographic emulsion faces are appositioned whereby to minimize the distance between the planes they occupy measured along the optical axis. As may be seen in Fig. 2, the "hour" teeth 62 on the ratchet 61 are conspicuously larger. Actually, there are forty-eight teeth, a number adequate for two days' time during their single revolution. The length of the oblique, upwardly presented surfaces of the teeth 62, over which the prong 29 will inutilely slip or idly back-drag during the fifty-nine thrusts imparted by the pawl 28 prior to the extra retraction when the finger tip 36 enters the notch 45, is such that the first fifty-nine retraction-movements of the rod 15 is each just insufficient in distance to catch the next tooth 62 by having the prong 29 slip therebehind. Actually, the prong 29 is ineffective during fifty-nine out of every sixty intermittent, power-actuated movements thereof while during the same per cent of its retractive movements the prong 29 does not quite pick up the next tooth. It then merely rides idly back and forth. Only when the stop finger's release, by entry into the notch 45 after every fifty-ninth minute, is the prong 29 retracted enough of an extra distance to spring behind the next "hour" tooth preparatory to next imparting a partial turn coincidently with the "minute" indexing from the numeral "59" to the numeral "00." Besides the colon mark ":" behind each "hour" number, the abbreviations "AM" and "PM" might be included with the "minute" numbers, if perchance desired. Observe also in Fig. 4 that any two properly positioned indicia or numerical images, say, "7" and ":26" as well as optical units yet to be identified (see also Fig. 6) are in the optical path of light. A filament 63 as the light source furnishes incident rays to the condensing lens 64 just ahead of the two overlapped transparencies 53 and 61 after which image-forming rays become incident to the projecting lens 65.

As exemplified in the illustrated application of my inventions, the sixty "minute" photographic indicia are successively brought into position for projection concurrently with the intermittent advance-movement of the sixty teeth on the ratchet 47. The disclosed, photographic "hour" indicia equal in number the forty-eight comparatively larger ratchet teeth 62 and each is necessarily contemplated to reach the position for optical projection once during any two days. Manifestly, instead of being a duplication of "hour" numerals from 1 to 24 each in an arcuate row along a semicircle, there might be four quadrant sets of numerals from 1 to 12. It is preferable to employ the turning cycle of the ratchet 47 during the photographic production of whatever duplicated sequences of "hour" numbers have been chosen, so as to guarantee that their circumferential spacing corresponds to that of the ratchet teeth with which they turn in unison, whereby to insure their proper registry with the objective after the cessation of turning movement of seven and one-half degrees imparted by each stroke of the pawl 32. When the two discs 53 and 61 are ready to have their emulsion rings exposed in circumferential succession in a special camera by the step method, (one separate exposure for each numeral) the same ratchet tooth being used to advance the disc for each successive exposure as shall be used by the projector assembly for alining some particular numeral before the projecting lens, there can not be any disalinement consequent to faulty adjustment as between images and ratchet teeth.

Inviting attention to the disclosures of Figs. 2, 3 and 4 of a simple yet highly important feature for attaining sharp focus of any pair of the images on the two discs respectively, notwithstanding their projectable positioning in planes which are spaced apart in the direction of or along the optical axis, the identification, mounting and location of what I have termed an "equalizer" follows. The plate or partition 1 necessarily has another "optical" aperture 66, most clearly to view in Fig. 3, which is intersected by the optical axis of the lenses 64 and 65 and which axis has the pair of closely adjacent projectable images 54 and 61a on opposite lateral sides thereof with the radially inward borders of the images substantially merging with or each containing the imaginary optical axis. As best shown in Fig. 2, an upstanding bracket 67 is secured to the partition plate 1, as by screws 68, between such plate and the glass disc 61. The bracket has secured at its top, in any approved manner (see Fig. 3), a lens, piece of quartz or glass plate 69 which extends part way across the aperture 66—enoughly entirely to intercept rays emerging through the positioned photographic image of the ring 54 while not enough to intercept any rays emerging through the nearer positioned "hour" ring 61a. The index of refraction of the simple glass plate 69 should be mutual determinants or have interdependence whereby differentially to compensate for the axial spacing between the emulsion rings 54 and 61a. In other words, the so-called focus equalizer 69 is readily to have its index of refraction determined empirically with consideration of, or reckoning with, the spacing between the planes of the image rings measured along the optical axis, whereby the focus-equalizer in effect puts the positioned image of the ring 54 which is furthest from the projecting lens 65 in the same plane as the one occupied by the positioned image of the ring 61a. (Well known law of optics—Hartung, p. 25.) Recapitulating, the discs 53 and 61 must occupy parallelly spaced planes, however close together, in order to permit free relative turning movement therebetween, but optical correction must be made in order to achieve equally sharp focus of the images (numbers) of both rings on the same screen 63a. Such a correction has been successfully accomplished by the equalizer 69 if correctly spaced from the ring 54 with accurate knowledge of its index of refraction.

Preparatory to reliable use of my apparatus it is expedient to provide simple means for effecting initial adjustments. To that end I have incorporated separate manual-adjustment mechanisms for presetting either ratchet, necessarily its companion image-carrying disc and the starting position of the notch 45 with relation to cooperative structural elements and perform the adjustment or adjustments by independent actuation of either ratchet by its coacting pawl. A pair of superposed, reactingly slidable, finger rods 70 and 71 are one simple mechanical agencies for effecting manual adjustment. They are both slidable through plate-secured end guides 72 and 73 which are clearly in view in Fig. 2. Two additional, intermediate guide blocks 74 and 75 are each intersected by both finger rods. The "minute" pawl 32 is actuatable by the lower rod 70 which slides loosely through the intermediary guide 74, but is fixed to the guide 75 by a set-screw 76 which projects far enough to pass through the plate aperture 1a and to be adapted to impinge against the arm 22 against the force exerted by the spring 77 (see Fig. 1) which is attached to the screw 76 while having its other end fixed to the plate. When the rod 70 becomes pushed inwardly, probably from outside of the box (not shown) it does not impart its adjusting movements to the pawl 28 nor to the "hour" ratchet 60, but only to the "minute" pawl 32 and the ratchet 47 which it is adapted to engage. Similarly, when the rod 71 is pushed inwardly any required number of times, it passes loosely not only through the end guides 72 and 73, but likewise through the intermediary guide block 75. However, the guide 74 carries a set-screw 78 for fixing the rod 71 to it, and the screw 78 extends through the plate hole 1b and far enough to impinge against the arm 24 which in carrying the pawl 28 along with it supplies step-by-step turning increments to the "hour" ratchet 60—similarly against the action of a spring 79 which connects the screw 78 with the plate 1 and so as periodically to have its tension increased temporarily.

The clearance between the roller 14 and a certain degree of arc of the cycle of the cam 9 just ahead of its lobe 11, with reference to its intended direction of rotation, is such as momentarily to leave both ends of the lever 13 loosely swingable just after the indexing of the fifty-ninth "second" tooth on the ratchet 47 and when the finger end 36 is about to enter the notch 45. Such clearance will permit the once-an-hour retractive shift of the rod 15 at the succeeding moment of entry of the end 36 into the notch 45, to be unimpeded by any restraint against the movement of the lower end of the lever 13 in a direction opposite to that of retractive rod shift. Consequently, when the lobe 11 immediately thereafter causes the rod 15 to perform its next advance movement and the prong 29—which had just slipped behind the "hour" tooth 62 upon which it had idly reciprocated fifty-nine times—to accomplish the hourly indexing.

The modification of Fig. 8 achieves compactness for the disc mounts by employing coaxial shafts therefor. An outer shaft 80 carries the disc 81 and an inner shaft 82 carries the companion, closely adjacent disc 83. Not shown, are the pair of ratchets to be cemented to the discs 81 and 83 or optionally to the collars on the shafts respectively, but not designated with a number because unclaimed.

I include, for record, my understanding that my focus-equalizer is contemplated to become an improving feature in marketed games which optically project not only one of a plurality of numbers on a disc, but a pintle-mounted spinner for rotation very close to the disc, adapted, for instance, to be rotated by a blast of air or magnetically and, when allowed to come to rest, to point to some particular numeral. At charitable, public raffles when the assembly of people is too large to permit all having access in reading proximity to the numerals on the wheel, the adaptation explained in the preceding sentence might be popularly put into use so that all may clearly observe the spin and the chance result.

Though the operation may have become evident to any reader, I add a short recapitulation. While the luminous projection of designs, symbols or images are very old practice and clock dials have been unsatisfactorily projected either because too small or too indistinct, my object has been to project a pair of differentially movable indicia, numerals being illustrated, so simple in outline as to permit great magnification without impairment of clarity and so as to insure sharp focus of a pair of correlated indicia which are simultaneously projected on a screen in reading association, despite their positioning, during projection, in planes which are separated along a common optical axis. Because one of the images (the hour showing, when projecting present time) is stationary during many intermittent movements of the other image (during fifty-nine "minute" interval changes) a clearance, for the minute numeral past some hour numeral while both are closely adjacent to each other crosswise to their common optical trail and yet non-interfering, becomes required. However, an optical correction for such clearance also becomes essential to perfection of result and that correction is performed by my focus-equalizer 69 which functions to achieve focus as though the emulsion carrying the image on the ring 54 were in the same plane as the emulsion image on the ring 61a.

The varying adjunctive mechanisms for "processing" including the progressing or indexing of the images in true-time relationship portray the parts of the apparatus which I chose for my successfully demonstrated model. In commercial production, which I plan next to launch, some of the details, but probably not the principles, may be altered. Manifestly, the method performed by my apparatus is largely peculiar thereto. The sequence of its steps are believed to be inseparable in the sense of corresponding each in coordination with the function of some part or some mechanism feasibly associated for cooperative attainment of some auxiliary object.

I claim:

1. In optical apparatus, the combination of a support, a source of light, a lens system, a pair of transparencies carried by said support between units of said system and each bearing an object arranged to intercept light rays from said source; said objects being relatively spaced crosswise to, so as to be wholly on opposite sides of, the optical axis when in the optical field of said lens system; said objects being furthermore separated in the direction of the optical axis, a screen and an optical equalizer wholly disposed in one-half of the optical projection field and on one side of the optical axis and between the transparencies and the said lens system and adapted for extra refraction whereby compensatorily to establish focus of one of said objects with equal clarity as an image upon said screen, said equalizer being predeterminedly fixed a certain axial distance from the object with which it shares a beam of light.

2. Apparatus as in claim 1, wherein the focus-establishing means is a stationary and transparent equalizer located in the optical trail of only one object.

3. Apparatus as in claim 1, in which the transparencies are in overlapping position and each is provided with a plurality of images, said transparencies being movably mounted whereby different pairs of images thereof respectively may be brought into the optical field whereby to intercept light rays.

4. Apparatus as in claim 1, wherein the images are in rows on the transparencies and the latter are movably mounted, together with means for actuating said transparencies in predetermined correlation.

5. Apparatus as in claim 1, in which the images are on rotatably mounted glass discs, together with means for effecting the periodic, step-by-step actuation of said discs.

6. Apparatus as in claim 1, in which the actuating means is turnable and comprises ratchets turnable with the transparencies respectively and differentially functioning pawls actuate the ratchets.

7. Apparatus as in claim 1, wherein the transparencies are each provided with a circumferential row of indicia and their margins overlap each other whereby certain indicia on one are beyond certain indicia on the other with reference to the optical axis.

8. Apparatus as in claim 1, comprising transparency-mounting shafts, together with friction means for restraining the turning movement of one of the shafts.

9. Apparatus as in claim 1, including power-operated actuating means comprising rotatable ratchets and pawls engageable therewith, together with devices for effecting adjustment actuation of said pawls respectively and each independently of the power means.

10. Apparatus as in claim 1, wherein the actuating means is rotatable and includes reacting rocking mechanism adapted simultaneously to engage and to turn both transparencies.

11. An optical apparatus comprising the combination with a lens system including a condensing lens, a projection lens, a pair of light-permeable supports between said lenses, an optical equalizer between said supports and said projection lens, the latter being disposed in its entirety in one-half of the optical field and between the supports and said projection lens; of a pair of turnable objects in substantially parallelly-adjacent planes which are substantially normal to the optical axis and which objects are furthermore located on opposite sides of the optical axis, ratchets turnable with said objects respectively, pawls arranged to engage said ratchets respectively and automatically operating mechanism for controlling one pawl against ratchet actuation thereby and for periodically releasing such pawl to permit its exercise of function.

12. Apparatus as in claim 11, there being a release finger engageable in a notch describing an orbit, once during each complete turn of one of the discs.

13. Apparatus as in claim 11, wherein there is a turnable member having an orbital notch and a control finger adapted periodically to enter said notch whereby intermittently inutile pawl rides idly over the oblique edge of one ratchet tooth during its actuation until the finger's entry into the notch retracts the pawl sufficiently to cause it to slip behind the near-radial edge of the same tooth.

14. In combination, a source of condensed light rays, a screen for receiving projected light rays, inbetween said source and screen a pair of transparencies each bearing an object, the pair of objects being in spaced relation to each other crosswise to the optical trail and also lying in planes in spaced relation along said trail, a projection lens system positioned between said transparencies and said screen, mechanism for selectively shifting said transparencies each relative to the other and an optical equalizer wholly disposed in one-half of the optical field and predeterminedly located between the transparencies and said lens system and along said trail to receive light rays from only one of said objects and adapted to compensate for its displacement along the optical axis relative to the other object and to establish sharp focus of its image on said screen.

15. In combination, a source of light, a screen, an image-projecting lens system therebetween, a pair of overlapping transparencies between axially spaced units of said lens system, said transparencies each bearing a marginal ring of objects, turnable mountings for said transparencies respectively and located on opposite sides of the optical axis of said lens system, the rings of objects likewise being on opposite sides of the optical axis, power means including a cam for periodically turning one of said mountings through a predetermined arc automatically operating means including a ratchet on one of said mountings and a pawl engageable therewith for periodically turning the other one of said mountings through a predetermined arc, said lens system including an extra refraction equalizing element disposed in its entirety in one-half of the optical field and predeterminedly located along the optical axis and between the transparencies and said projecting lens.

16. The combination as an optical trail, of a source of light, a condensing lens, a projecting lens, there being axially between said pair of lenses a pair of supports fashioned with light permeable objects, images whereof are to be projected, said supports being disposed in parallelly spaced planes which are normal to the optical axis, extending across from one-half of the optical field into its other half and with said objects on opposite sides of the optical axis, a screen and an optical equalizer located axially between said lenses and between said supports and the projecting lens and also located laterally of the optical axis and in only one-half of the field, said equalizer being adapted to compensate by perfecting the focus upon said screen of light rays intercepted by only one of said objects.

RUSSELL E. WILSON.

REFERENCES CITED

The following references are of record in the file of this patent:

UNITED STATES PATENTS

| Number | Name | Date |
| --- | --- | --- |
| 573,436 | Barr | Dec. 22, 1896 |
| 1,147,501 | Genter | July 20, 1915 |
| 1,208,490 | Comstock | Dec. 12, 1916 |
| 1,371,970 | Furman | Mar. 15, 1921 |
| 1,485,956 | Bredon | Mar. 4, 1924 |
| 1,524,089 | Eppenstein | Jan. 27, 1925 |
| 1,940,004 | Mayhugh | Dec. 19, 1933 |
| 2,027,369 | Bourges | Jan. 14, 1936 |
| 2,138,821 | Potter | Dec. 6, 1938 |
| 2,184,831 | Campbell | Dec. 26, 1939 |
| 2,201,376 | Prins | May 21, 1940 |
| 2,214,050 | Fowler | Sept. 10, 1940 |
| 2,221,063 | Teague et al. | Nov. 12, 1940 |
| 2,258,903 | Mitchell | Oct. 14, 1941 |
| 2,286,471 | Dahl | June 16, 1942 |